UNITED STATES PATENT OFFICE.

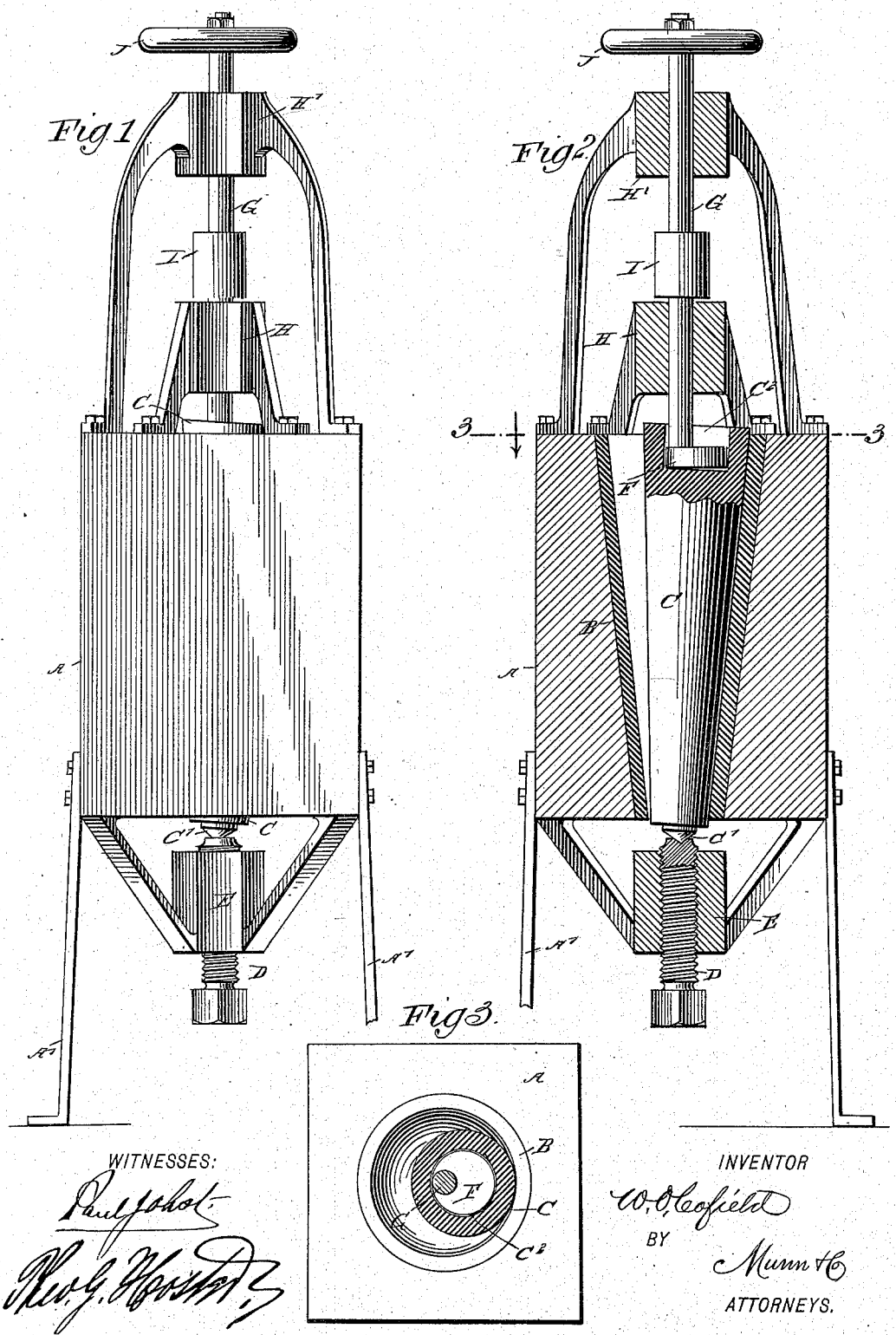

WILLIAM O. COFIELD, OF PIQUA, OHIO.

REDUCING-MILL.

SPECIFICATION forming part of Letters Patent No. 557,973, dated April 7, 1896.

Application filed April 9, 1895. Serial No. 545,079. (No model.)

*To all whom it may concern:*

Be it known that I, WILLIAM O. COFIELD, of Piqua, in the county of Miami and State of Ohio, have invented a new and Improved Reducing-Mill, of which the following is a full, clear, and exact description.

The object of the invention is to provide a new and improved reducing or grinding mill which is simple and durable in construction, very effective in operation, and arranged for grinding or reducing grain, ore, chemicals, and other articles and substances in a very simple and effective manner.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a side elevation of the improvement. Fig. 2 is a sectional side elevation of the same, and Fig. 3 is a sectional plan view of the same on the line 3 3 of Fig. 2.

The improved mill is provided with a suitably-constructed frame A A' mounted on legs, and supporting a casing B, made cone-shaped to form at its inside an inverted-cone-shaped grinding-surface on which rolls an inverted cone C, set into the said casing and having its lower apex end formed with a point C', set in a step formed by a screw D screwing in a nut E, secured to or supported from the under side of the frame A. In the top or base end of the cone C is formed a central recess $C^2$, into which fits an eccentric F, secured on the lower end of a shaft G, mounted to turn in suitable bearings H and H', attached to the top of the frame A.

On the shaft G is secured a pulley I, connected by a belt with other machinery for imparting a rotary motion to the shaft G to cause the eccentric F to impart a rolling-off motion to the said cone C to grind the material placed between the cone and the grinding-surface of the casing B. On the shaft G is also secured a fly-wheel J, so as to insure a steady motion of the shaft G.

The lower end of the cone C fits comparatively snugly in the lower end of the casing. By adjusting the screw D the position of this lower end of the cone relative to the casing can be regulated to a nicety.

Now it will be seen that the material to be ground and introduced at the upper end of the casing B is ground by the cone C rolling off on the grinding-surface of the casing B. The ground material passes downward in the casing B, to be finally discharged at the lower end thereof.

A mill constructed as shown and described can be used for almost any purpose for which mills are usually employed—that is, for reducing grains or chemicals and other substances.

Having thus fully described my invention, I claim as new and desire to secure by Letters Patent—

1. A reducing-mill comprising a fixed casing having an inverted-cone-shaped grinding-surface, an inverted cone adapted to roll upon the said surface to grind the material placed between the cone and the surface, said cone having a recess in its top or large end and an eccentric mounted on a revolving shaft and engaging the recess of the said cone to impart a rolling motion to the latter, substantially as shown and described.

2. A reducing-mill comprising a fixed casing having an inverted-cone-shaped grinding-surface, an inverted cone adapted to roll upon the said surface to grind the material placed between the cone and the surface, said cone having a central recess in its top or large end an eccentric mounted on a revolving shaft and engaging the said recess of the cone to impart a rolling motion to the latter, and a screw forming a step for the lower, pointed end of the said cone, substantially as shown and described.

WILLIAM O. COFIELD.

Witnesses:
  OSCAR W. RICHARDSON,
  WM. C. JOHNSTON.